Dec. 2, 1969   M. L. VALOIS   3,481,470
COMBINED SKIMMER AND FILTER FOR SWIMMING POOLS
Filed Oct. 3, 1966   4 Sheets-Sheet 1
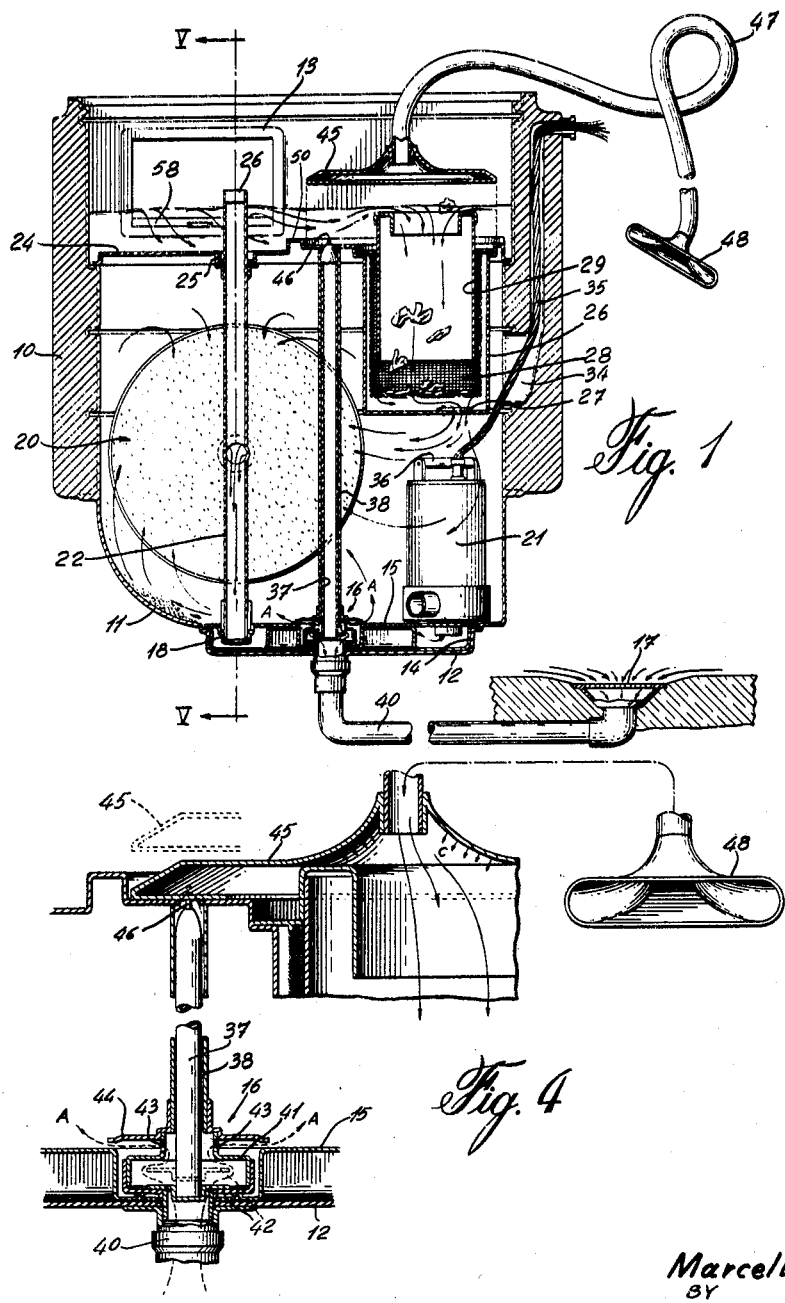
INVENTOR
Marcel L. VALOIS
BY
ATTORNEY Dec. 2, 1969            M. L. VALOIS            3,481,470
COMBINED SKIMMER AND FILTER FOR SWIMMING POOLS
Filed Oct. 3, 1966            4 Sheets-Sheet 2
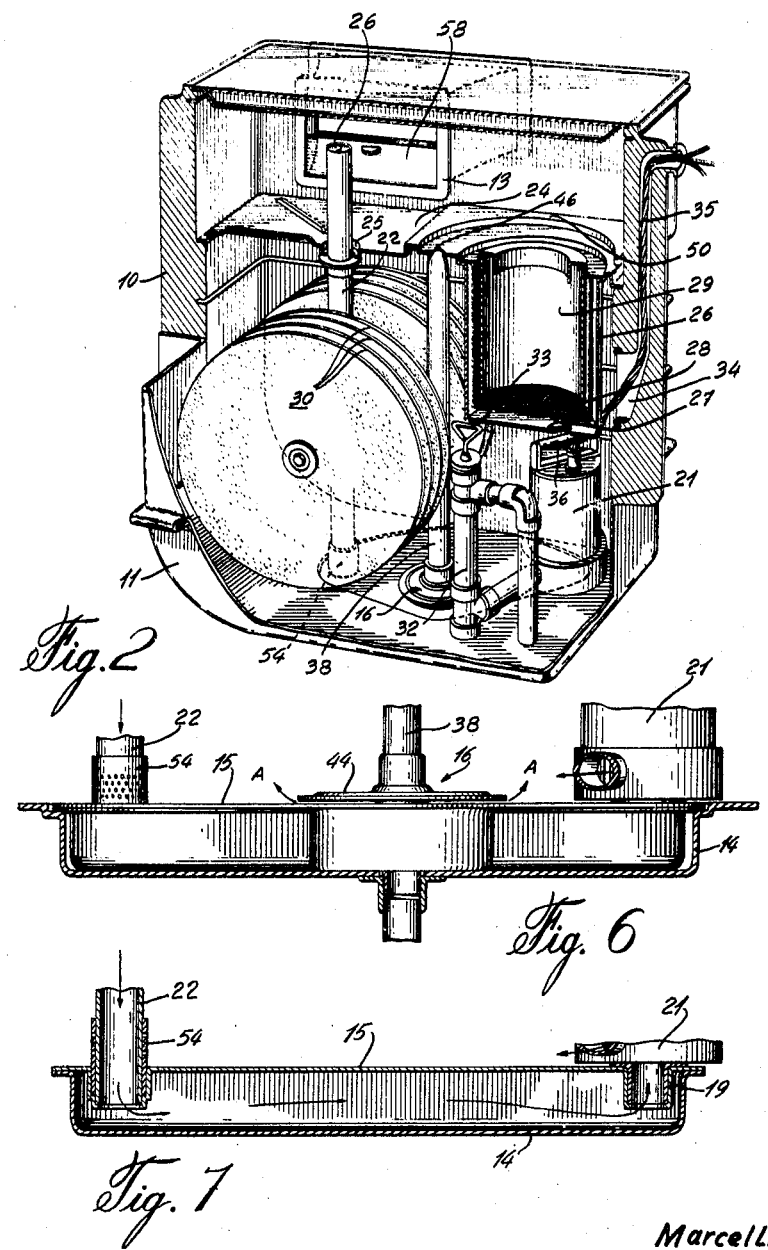
INVENTOR
Marcel L. VALOIS
BY
ATTORNEY

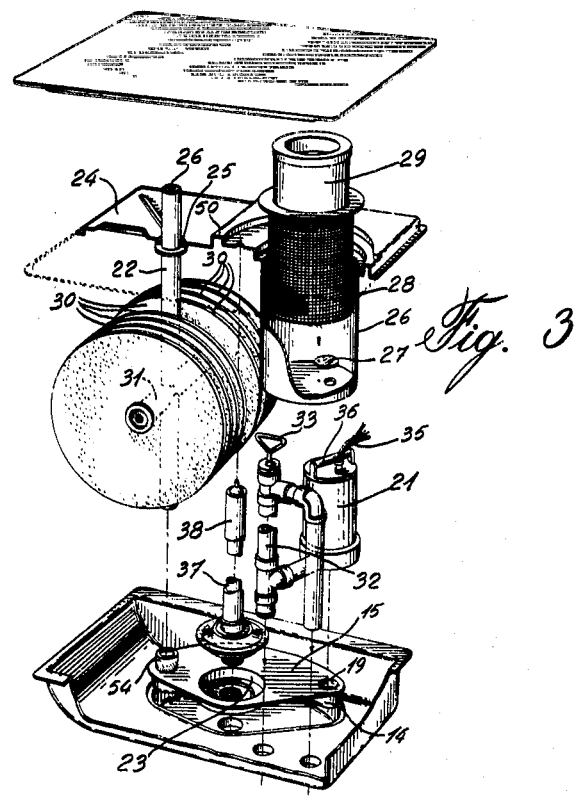
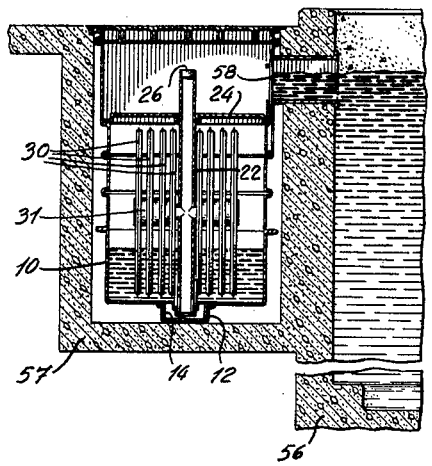

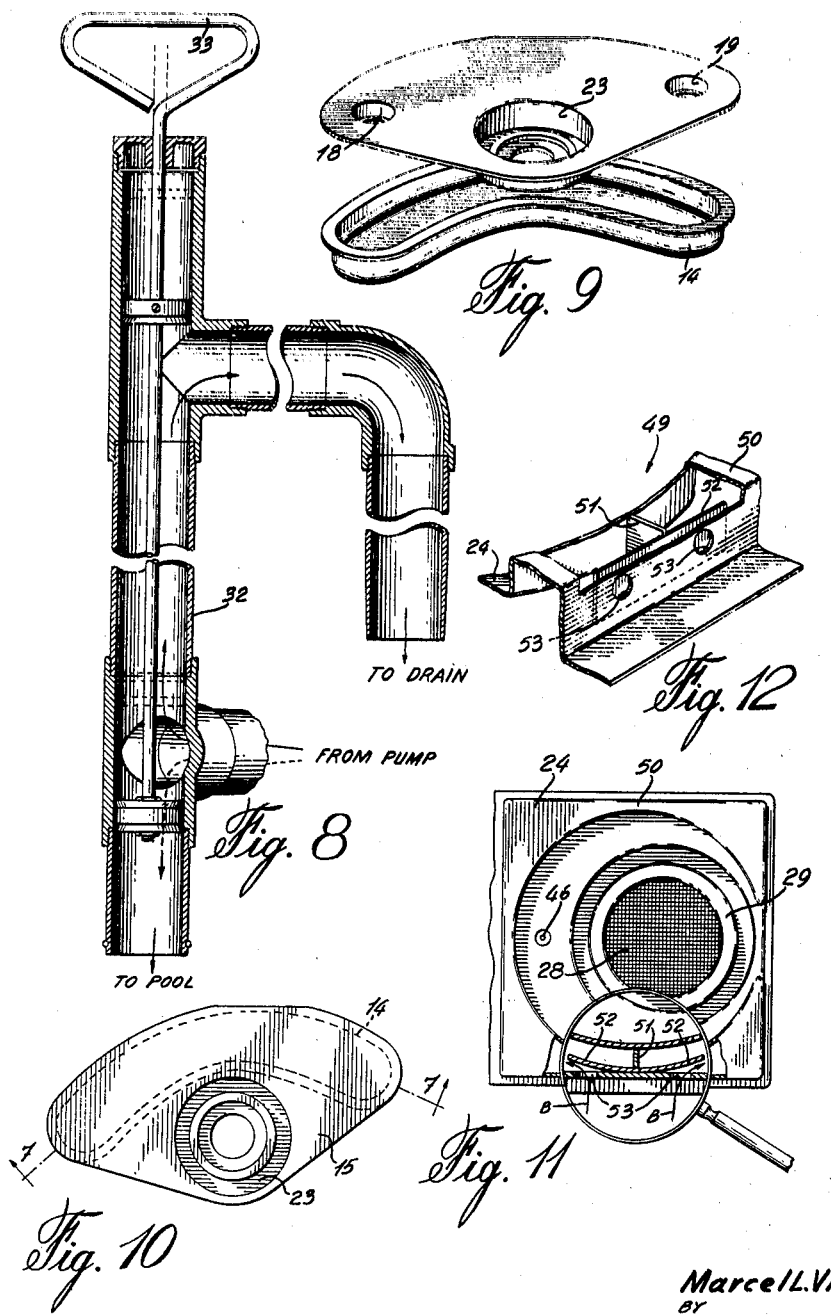

United States Patent Office 3,481,470
Patented Dec. 2, 1969

1

3,481,470
COMBINED SKIMMER AND FILTER FOR SWIMMING POOLS
Marcel L. Valois, Laval Sur Le Lac, Quebec, Canada, assignors to Val Mar Ltee, Chomedey, Quebec, Canada
Filed Oct. 3, 1966, Ser. No. 583,822
Int. Cl. E04h 3/20
U.S. Cl. 210—169                                         1 Claim

ABSTRACT OF THE DISCLOSURE

A water cleaning device for a swimming pool which consists of a tank containing a set of filtering discs axially mounted on an outlet pipe, a normally closed vacuum valve at the bottom of the tank connected between the tank and the bottom of the pool and a pump connected between the said outlet pipe and the drain, whereby the pump creates a vacuum within the tank to open the vacuum valve and a circulation of the water from the tank through the discs and the output pipe and back to the pool.

---

The present invention relates to a skimmer and filter for a swimming pool.

The present invention is particularly directed to a filtering device for swimming pool which is simple and economical. The device is adapted to be made substantially of fiberglass or other suitable plastic materials the elements of the said device being adapted to be taken apart.

The filtering device is furthermore adapted to receive the water from the upper and the lower level of the pool. The device is additionally adapted to be connected to a vacuum cleaner device in order to clean the bottom surface of the pool. The connection between the vacuum cleaner and the filtering device is furthermore adapted to stop the entry of water from the upper and lower level of the pool.

The device therefore serves two functions, that is, to filter the water of the pool and to clean the bottom of the pool.

A further advantage of the present invention consists also in limiting the error which consists of unvoluntarily emptying the pool.

The skimmer and filter for the swimming pool essentially comprise a tank to be mounted adjacent a skimmer throat near the upper surface of a pool, a cover for the said tank, an opening in said cover for receiving water from said throat, filter means mounted on an outlet pipe in the tank, the said outlet pipe receiving the water after being filtered, and pumping means connected on the said pipe for the suction of the filtered water and the elimination of the water from the said tank.

In addition, the device will preferably comprise a vacuum cut-off valve mounted between the drain of the bottom of the pool and the tank, a float in said vacuum valve for stopping the inlet of water from the bottom drain, a closure cap to fit over the opening in the cover for actuating the float, the said closure cap being connected to a vacuum cleaner to clean the bottom of the pool.

The invention accordingly comprises the construction hereinafter described, the scope of the invention being indicated in the following drawings.

In the accompanying drawings in which one of various embodiments of the invention is illustrated, FIGURE 1 is a sectional view of the skimmer and filter device, FIGURE 2 is a perspective view of the filter device with a part of the wall of the tank removed, FIGURE 3 is a partly exploded view of the filtering device,

2

FIGURE 4 appears on the sheet with FIGURE 1 and represents the operation of the closure cap with the cut-off vacuum valve, FIGURE 5 appears on the sheet with FIGURE 3 and represents a sectional view taken along line V—V in FIGURE 1, FIGURES 6 and 7 appears on the sheet with FIGURE 2 and represent two sectional views of the tray used for the circulation of the filtered water, FIGURE 8 represents the bath wash valve for connecting the pump to the pool or the drain, FIGURE 9 shows an exploded view of the tray and its cover, FIGURE 10 shows an upper view of the tray and its cover, FIGURES 11 and 12 illustrate a limiting suction valve.

FIGURE 1 shows a sectional view of the filter device comprising a tank 10 having a lower part 11 and a recess 12 in the bottom of the tank. A skimmer throat 13 projects in front of the tank towards the pool for receiving the water from the upper level of the pool. The recess 12 is shaped to receive a tray 14, a cover 15 for said tray and a foot valve 16 which is adapted to stop the water coming from the bottom drain 17 of the pool. The tray 14 has preferably a banana-shape wherein the foot-valve 16 is located inside the convexity of the said tray. The cover 15 has two recessed apertures 18 and 19 to receive respectively an outlet pipe 22 on the septum filter 20 and the pump 21. This arrangement facilitates the easy removal of the outlet pipe 22 and the pump 21 from the cover 15 of the tray 14.

The cover 15 has a central large apertured recess 23 consisting in the housing for the foot-valve 16.

At the upper level of the tank 10 just below the skimmer throat 13 a cover or baffle 24 is mounted to rest on the sides of the tank. The cover 24 has an opening 25 for the passage of an extension of the outlet pipe 22, the upper end of the said pipe being adapted to receive a vacuum gage 26 for measuring the vacuum coming from the pump 21 which reaches the septum filter 20. The right-hand side of the cover as shown in FIGURES 1 and 2 has a large opening for receiving the filtering housing 26 which has a trap 27 in its lower part for the circulation of the water from the upper part of the cover 24 to the interior of the tank 10. The filtering housing 26 is preferably cylindrical in shape and is adapted to receive concentrically therein a strainer basket 28 and a floating weir 29. The strainer basket will help to remove the large pieces of impurities or dirts such as pieces of mud or leaves coming from the skimmer throat 13.

On the left-hand side of the tank 10 as shown in FIGURES 1 and 2, a septum filter consisting of a plurality of discs 30 made of fabric material is mounted on a horizontal pipe 31, the said pipe 31 being connected to a cross pipe 22 which is used to support the septum filter assembly 20.

The water that comes into the skimmer throat 13 passes through the filtering housing 26 falls into the lower part of the tank 10 enters the discs 30 of the septum filter 20 enters the perforations along the horizontal pipe or connection tube 31 goes down the outlet pipe 22, passes through the tray 14 and is sucked by the pump 21. The pump 21 returns the water to a backwash valve as particularly illustrated in FIGURE 8. The handle 33 of the back-wash valve 32 provides a choice for the water leaving the pump to go either to the drain or back to the pool. As illustrated in FIGURE 8, when the handle 33 is in the lower position as represented in FIGURE 8 the water is directed to move upwardly and down to the drain. If the handle 33 is raised, the water leaving the pump will follow the dotted lines shown in FIGURE 8 and go back to the pool.

The pump 21 which is usually the only metallic element in the filter device is connected by an electric wire 35 coming from the outside through a conduit 34. A pump is also provided with a handle 36 which is adapted to lift the pump from the recess 19.

The foot valve 16 extends upwardly into a main drain inlet valve float 37 surrounded by a stem 38 up to the level of the cover 24. The combination of the foot valve 16 and the main drain inlet valve float 37 is particularly shown in FIGURE 4. The water coming from the bottom drain 17 of the pool passes through the pipe 40 and reaches the bottom of the foot valve 16. The foot valve consists of a hollow box 41 threadedly engaged to the bottom of the recess 12 in the tank 10 and communicates with the pipe 40 coming from the bottom drain 17. The lower end of the float 37 extends in a box 41 with a plate 42 adapted to stop the water coming from the pipe 40. The plate 42 shown in dotted lines (FIGURE 4) represents its normal position when the water of the pool is filtered. Accordingly, the water follows the arrows A, that is, it comes from the pipe 40 reaches the box 41, surrounds the plate 42 and comes out of the box 41 through apertures 43 to reach the interior of the tank 10. A lid 44 is foreseen to prevent any dirts from obstructing the apertures 43. As shown in full lines the plate 42 may be lowered by the valve float 37 to obstruct the entrance of the water from the pipe 40. The lowering of the valve float 37 is produced by a closure cap 45 which depresses the projection 46 at the upper end of the valve float 37.

As explained above the closure cap is applied over the filtering housing 26 when the bottom of the pool needs to be cleaned by vacuum means. The suction created by the pump inside the tank 10 exists inside the filtering housing 26 and when the cap 45 is placed on the cover 24 over the filtering housing 26 the suction reaches the vacuum cleaner tube 47 down through the mouth 48 which is used to go over the bottom surface of the pool so that the same may be cleaned from any dirt lying on it. When the closure cap 45 is lowered on the cover 24 the projection 46 of the valve float 37 is lowered and acts as a cut-off for the suction of the water coming from the bottom drain 17. This arrangement stops the water coming from the skimmer throat 13 and from the bottom drain 17 and all the suction of the pump 21 acts to suck the water from the vacuum cleaner tube 47 down to the filtering housing 26. The suction inside the cap 45 is illustrated by the arrows C in FIG. 4. This arrangement is a great improvement over the prior filtering device of the type for its simplicity in converting the normal filtering of the water to the cleaning of the bottom of the pool. Furthermore, it is pointed out that 100% of the efficiency of the device is converted to clean the bottom of the pool by converting the suction of the water from the upper and lower part of the pool into the vacuum cleaner 47.

In order to provide a good suction, the cover 24 is slightly recessed to receive the closure cap 45 and is adapted to provide a good fit to concentrate the suction to the vacuum cleaner tube 47.

The suction in the tank may become so great that a limiting suction valve 49 needs to be foreseen. Such limiting suction valve is shown in FIGURES 11 and 12 and is built within the ridge 50 surrounding the recess in the cover 24 which is adapted to receive the closure cap 45. Inside the ridge 50 at a location as shown in FIGURE 11 or a corresponding location a cross-plate 51 is fixed to a double wall 52 mounted parallel to the side of the ridge 50 provided with apertures 53. As illustrated in FIGURE 11, if the suction becomes too great inside the filtering housing 26 the double wall 52 which is made of resilient material such as a plastic strip will be moved inwardly to let the air and water circulate in the direction of the arrows B. The flexibility of the double wall 52 is computed to correspond to a predetermined limiting suction factor.

In order to stop the sand from entering into the tray 14 when the tank is being cleaned or during the normal use of the instruments, a perforated sleeve 54 (FIGS. 6 and 7) is mounted in the recess 18 in order to receive the outlet pipe 22. Accordingly the sand which is illustrated by a reference number 55 which may accumulate in the bottom of the tank may enter into the tray 14 when the outlet pipe 22 is removed in particular for cleaning purposes. The sleeve will stop the sand while the perforations in the sleeve will let the water circulate down the tray 14.

FIGURE 5 shows the pool 56 with the adjacent enclosure 57 for receiving the tank 10. In this figure a cross-sectional view of the septum filter illustrates the step when the septum filter is cleaned. For such a step the sluice 58 is raised to stop the water coming from the pool 56 to enter the tank 10. When the sluice 58 is closed, the pump withdraws the majority of the water in the tank 10 as shown in FIGURE 5 and returns it to the pool or sends it to the drain. The covers 59 and 24 are removed and the septum filter comprising the discs 30, the outlet pipe 22 and the connection tube 31 may be lifted out of the tank and washed or sprayed in order to remove the dirt, the sand or any particle which are gripped onto the discs 30. When the discs 30 are cleaned the septum filter is replaced by introducing the outlet pipe 22 into the recess 18. The sluice 58 is then opened and the normal operation of the filter may start over again.

The operation of the skimmer and filter device may be resumed as follows:

The water from the pool enters the skimmer throat 13 flows over the cover 24, enters the filtering housing 26. The large pieces of material such as leaves, large pieces of sand or small stones are stopped by the strainer basket 28. The water which has been skimmed by the strainer basket 28 flows down the trap 27 which is partly opened according to the flow of water desired and enters the tank 10. The pump 21 which is in operation creates a suction in the tray 14, in the outlet pipe 22 in the horizontal pipe or connection tube 31 which is perforated and through the discs 30 which are made of fabric or any permeable material. Accordingly the water in the tank enters the discs 30 flows down the oultet pipe 22 circulates into the tray 14 comes out the pump 21 and goes out into the back wash valve 32 which rejects the water selectively back to the pool or to the drain according to the position of the handle 33.

The same suction of the pump attracks the water from the bottom drain 17 of the pool into the foot valve 16 and the water once into the tank 10 follows the same pattern as described above.

If the bottom of the pool needs to be cleaned, a vacuum cleaner tube 47 having a closure cap 45 and a mouth 48 is used to pick up the dirt or other unwanted particles lying on the bottom of the pool. Accordingly, a closure cap 45 is placed on the cover 24 within the ridge 50 to close the opening provided by the filtering housing 26 and to press down on the projection 46 of the main drain and the inlet valve float 47. The placement of the closure cap 45 stops the water coming from the skimmer throat 13 to go down the filtering housing 26 and the lowering of the valve float 37 closes the foot valve 16 so that the water from the bottom drain 17 of the pool is also stopped. Accordingly all the suction provided by the pump 21 which was used to suck the water from the skimmer throat 13 and the bottom drain 17 is now transferred to receive the water from the vacuum cleaner tube 47. Therefore, 100% of the suction and the efficiency of the pump is used to clean the lower surface of the pool. This is one of the main improvements of the present invention. The suction is so great that it has been found very difficult to remove the closure cap 45 unless a limiting valve 49 is foreseen around the ridge 50 surrounding the opening for the closure cap 45.

The filter according to this invention is preferably made completely of fiberglass or suitable plastic adapted for the purpose except for the pump which is usually made of stainless steel. The whole tank is designed to be disassembled in few minutes for cleaning and reassembled very shortly. The cover of the tray 14 is built with two recesses 18 and 19 which receives respectively the outlet pipe 22 and the lower part of the pump 21. The pipe 22 and the pump 21 are slidingly engaged in the recesses 18 and 19. The foot valve 16 and the valve float 37 are threadedly engaged in the bottom of the tank and may also be removed quickly.

I claim:
1. A water cleaning device for a swimming pool comprising:
   a tank adapted to be mounted adjacent a skimmer throat near the upper surface of the pool, and adapted to be filled by the water of said pool,
   a cover fixed over said tank and being provided with a filtering housing containing filter means for filtering water received from the throat,
   a septum filter made of a plurality of connected discs mounted in said tank for filtering the water into which it is adapted to be submerged,
   an outlet pipe axially mounted within said discs for receiving the filtered water from said discs,
   a pump mounted in said tank and connected to said pipe for applying suction to the water therein and said discs and adapted to discharge said filtered water to said pool, the said pump adapted to create vacuum within said tank, a normally closed drain valve mounted at the bottom of the tank and connected between the tank and the bottom of the pool, a float connected to said valve and constructed to rise within the tank and open the valve,
   extension means between the float and the cover, a closure cap adapted to fit over the filtering housing and to actuate the extension means for lowering the float and closing the drain valve, a vacuum cleaner tube connected to said closure cap, whereby the vacuum within the tank provides a suction in the cleaner tube for cleaning the inner surface of the pool.

References Cited

UNITED STATES PATENTS 3,169,920   2/65   Payne _____ 210—169

RUBEN FRIEDMAN, Primary Examiner

T. A. GRANGER, Assistant Examiner

U.S. Cl. X.R.

15—1.7